US006093469A

United States Patent [19]

Callas

[11] Patent Number: 6,093,469

[45] Date of Patent: Jul. 25, 2000

[54] MAT AND METHOD OF MAKING MAT

[76] Inventor: Michael T. Callas, 7400 Metro Blvd., Suite 100, Edina, Minn. 55439

[21] Appl. No.: 09/140,898

[22] Filed: Aug. 25, 1998

Related U.S. Application Data

[60] Provisional application No. 60/087,493, Jun. 1, 1998.

[51] Int. Cl.$^{7}$ .................................. B32B 3/02; B32B 3/26

[52] U.S. Cl. .................................. 428/95; 428/82; 428/88; 428/122; 428/167; 15/217; 16/16

[58] Field of Search .................................. 428/99, 122, 82, 428/83, 88, 95, 192, 167; 15/215, 217; 16/7, 16; 296/97.23

[56] References Cited

U.S. PATENT DOCUMENTS

D. 267,535 1/1983 Yamazaki et al. .
D. 299,171 12/1988 Allen, Jr. .
2,258,314 10/1941 Bonnell .
3,234,577 2/1966 Mann, Jr. .
3,238,554 3/1966 Mann, Jr. .
3,435,480 4/1969 Mann, Jr. .
3,435,481 4/1969 Mann, Jr. .
4,054,698 10/1977 Hamrah .
4,353,944 10/1982 Tarui .
4,654,245 3/1987 Balzer et al. .
4,877,672 10/1989 Shreiner .
5,018,235 5/1991 Stamatiou et al. .
5,114,774 5/1992 Maxim, Jr. .
5,142,733 9/1992 Mogel et al. .
5,157,804 10/1992 Williams .
5,683,780 11/1997 Rodger et al. .............................. 428/95

FOREIGN PATENT DOCUMENTS 1375276 1/1973 United Kingdom .

*Primary Examiner*—Alexander Thomas

[57] ABSTRACT

An entrance mat has a polypropylene greige fiber pad with a trimmed outer peripheral edge and a backing of non-skid plastic material. The backing has longitudinal treads having high friction and tacky properties which prevent creep and folding of the pad on a floor. An edge has a non-skid web secured with an adhesive to the backing and a lip extended over the adhesively secured to the trimmed outer peripheral edge.

22 Claims, 7 Drawing Sheets

11 14 13 12 31 26 24 18 29 19 23 22 21 32 28 22A 33 15 16

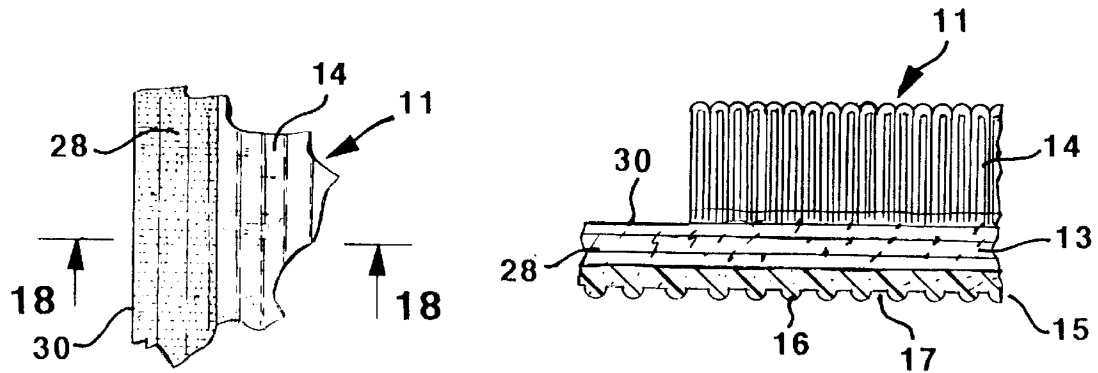
FIG.17
FIG.18
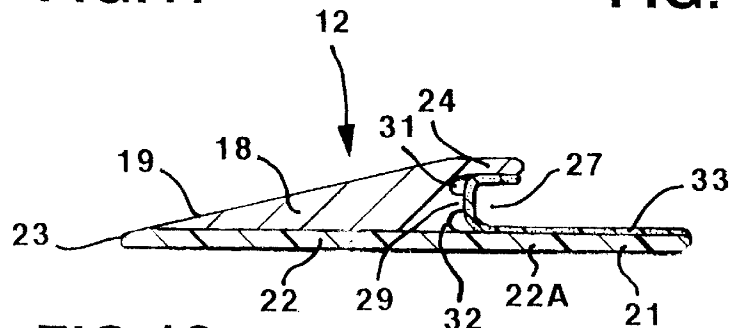
FIG.19
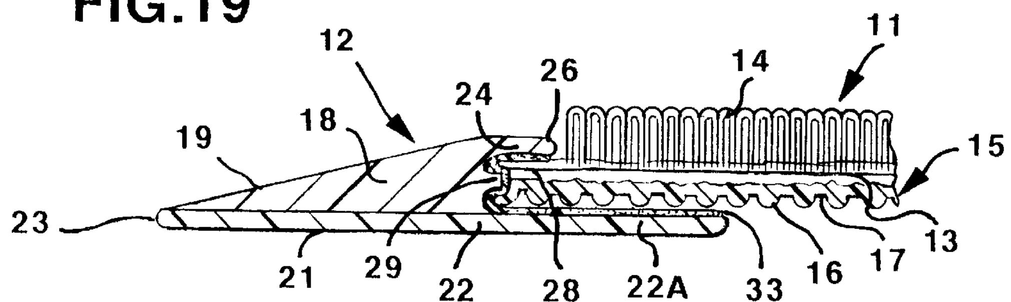
FIG.20
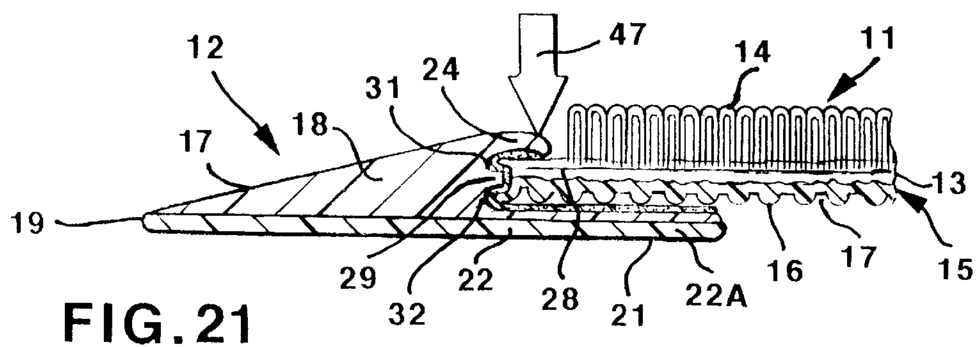
FIG.21

MAT AND METHOD OF MAKING MAT

CROSS REFERENCE TO RELATE APPLICATION:

This application is a continuation of U.S. Provisional patent Application Ser. No. 60/087,493, filed Jun. 1, 1998.

FIELD OF THE INVENTION

The invention relates to floor covering used as entrance mats in commercial and retail buildings. The mats have plastic fiber pads secured to edging and non-slip backings.

BACKGROUND OF THE INVENTION

Prior entrance mats tend to creep and fold due to pressure and impact forces of material handling carts and shopping carts on the edges of the mats. The edges in time crack, split and curl up which can cause carts to jam on the edges and persons to trip and fall. The edges also separate or become loose from the pad causing further trip hazards.

Carpet binding tape attached to the outer edges of carpets are known in the prior art. J. J. Hamrak in U.S. Pat. No. 4,054,698 describes a carpet tape having a flat body and a curved portion that extends over the pile along the edge of a carpet. A pressure sensitive adhesive secures the backing of the carpet to the top of the body. The curved portion of the tape is not attached to the carpet. Water and dirt can collect under the curved portion of the tape. The curved portion of the tape can flex upward and peel away from the carpet. The carpet backing has a smooth surface which does not inhibit slip and creep of the carpet on a floor.

H. A. Maxin Jr. in U.S. Pat. No. 5,114,774 addresses the problems of water and oil contamination of floor mats and preventing pedestrian slipping and skidding on wet and oily mats. The mat has a skid free upper surface bounded by an edging having self gripping fasteners and a removable member capable of absorbing liquids, such as water or oil. The removable member is located below the skid free upper surface and edging. The fasteners are attached to the removable member of the mat. The removable member does not inhibit movement and creep of the mat on the floor. The liquid collected in the member reduces the friction and holding properties of the mat on a floor thereby enhancing creep of the mat on the floor.

SUMMARY OF THE INVENTION

The invention is a floor and entrance mat having an edge that does not curl, crack or peel away from a fiber pad. The pad has a backing of non-skid material which cooperates with a non-skid web on the edge to prevent creep and folding of the mat on a floor. The edge is adhesively secured to top and bottom edge portions of the pad so that the edge does not separate from the pad and water and dirt do not collect within the edge. Wheeled carts and trucks can be readily rolled on and off the pad and edge without damaging the materials of the pad and edge.

The mat has a pad of greige material having a base and fibers projected upwardly from the base. A backing of non-skid plastic is bonded to the bottom of the base. The backing has linear treads separated with grooves that grip the floor to prevent creep and folding of the mat on the floor covered by the mat. The base has a peripheral edge portion around the mat. The top of the edge portion has been trimmed to a flat surface. An edge having an upwardly inclined body, a lip joined to the body, and a web joined to the body is adhesively secured to the peripheral edge portion of the base. The lip extends over the flat surface of the base. The web has an extension located under a portion of the backing. The lip and extension form a pocket that accommodates the peripheral edge portion of the base and a portion of the backing. The adhesive firmly secures the edge portion of the flat surface of the base to the lip and body and the portion of the backing to the extension of the web. The body is a tough and hard plastic, such as polyethylene chloride plastic. The web is soft and flexible plastic. The lip, body and web are co-extruded as a one-piece structure. The inner part of the body has a linear horizontal rib projected into the pocket and recesses on opposite sides of the rib. The rib extends into the outer edge of the base so that the adhesive bonds the base to the rib and base. Excess adhesive flows into the grooves as apposed to the fibers adjacent the lip.

DESCRIPTION OF THE DRAWINGS

FIG. 17 is a top plan view of a section of the greige of the entrance mat;

FIG. 18 is an enlarged sectional view taken along line 18—18 of FIG. 17;

FIG. 19 is a sectional view similar to FIG. 10 with a layer of adhesive material on the lip and extension of the edge;

FIG. 20 is a sectional view similar to FIG. 19 showing the greige being inserted into the pocket under the lip of the edge;

FIG. 21 is a sectional view similar to FIG. 20 showing the lip of the edge being forced down to press the adhesive into complete contact with the lip and extension of the lip and peripheral flange of the greige.

DESCRIPTION OF PREFERRED EMBODIMENT AND METHOD OF MAKING THE ENTRANCE MAT OF THE INVENTION

Figure 1:
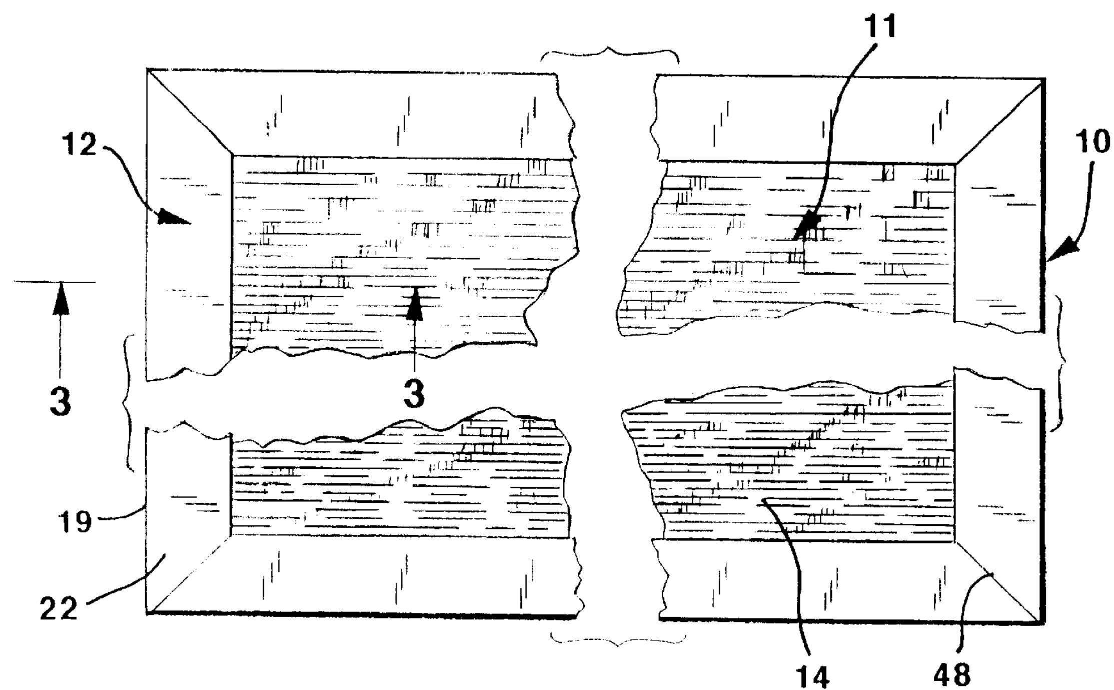
FIG. 1 is a fragmentary top plan view of the entrance mat of the invention.
Figure 2:
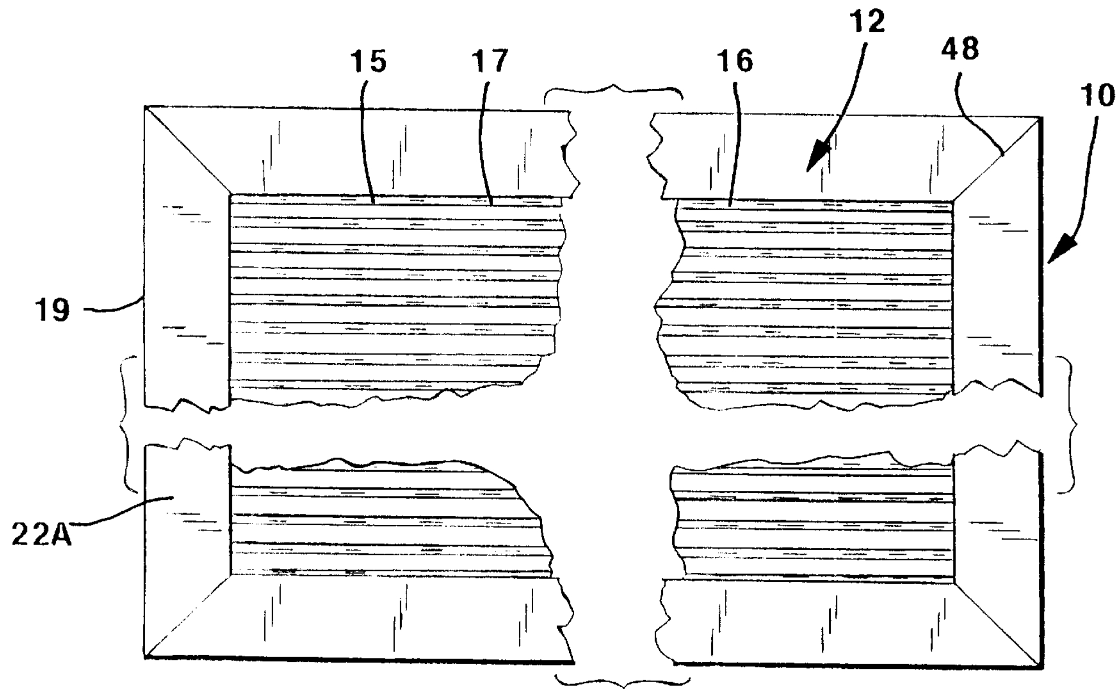
FIG. 2 is a fragmentary bottom plan view of the entrance mat of FIG. 1.

Mat 10, shown in FIGS. 1 and 2, is a rectangular entrance mat having a pad 11 attached to an outer peripheral border or edge 12. The size and shape of mat 10 can vary to fit the floor location accommodating the mat. Mat 10 is custom made for commercial and retail buildings as vestibule and entrance mats to trap and hold water, sand dirt, moisture and snow that is carried by persons and carts into the buildings. The mat is periodically cleaned to remove the foreign materials to maintain a clean and safe building environment. Mat 10 hugs the floor and holds its shape and position on the floor.

Figure 3:
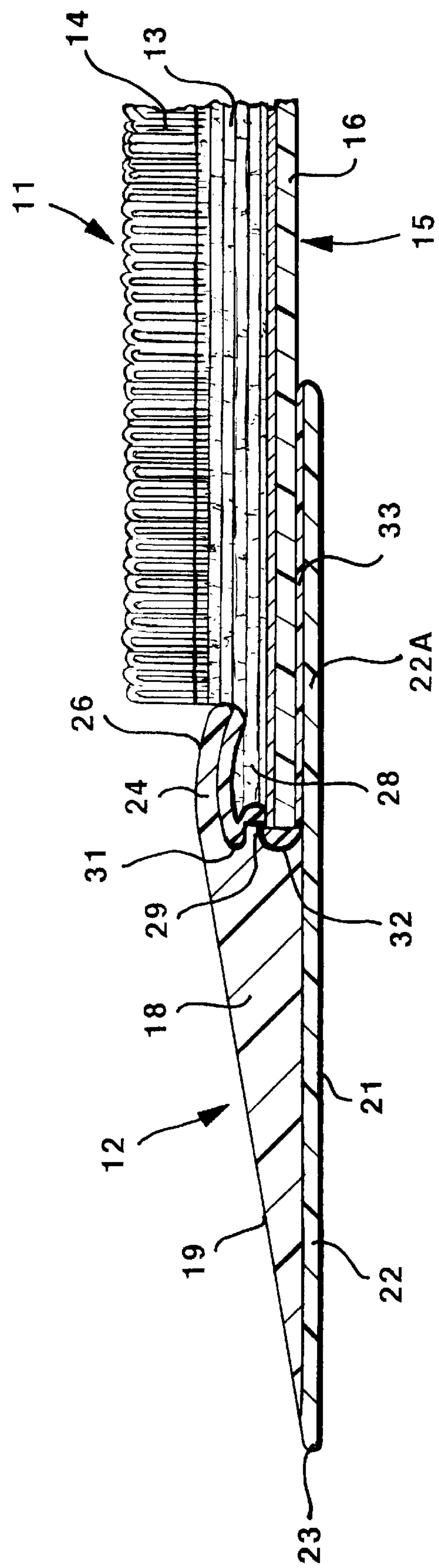
FIG. 3 is an enlarged sectional view taken along line 3—3 of FIG. 1.
Figure 4:
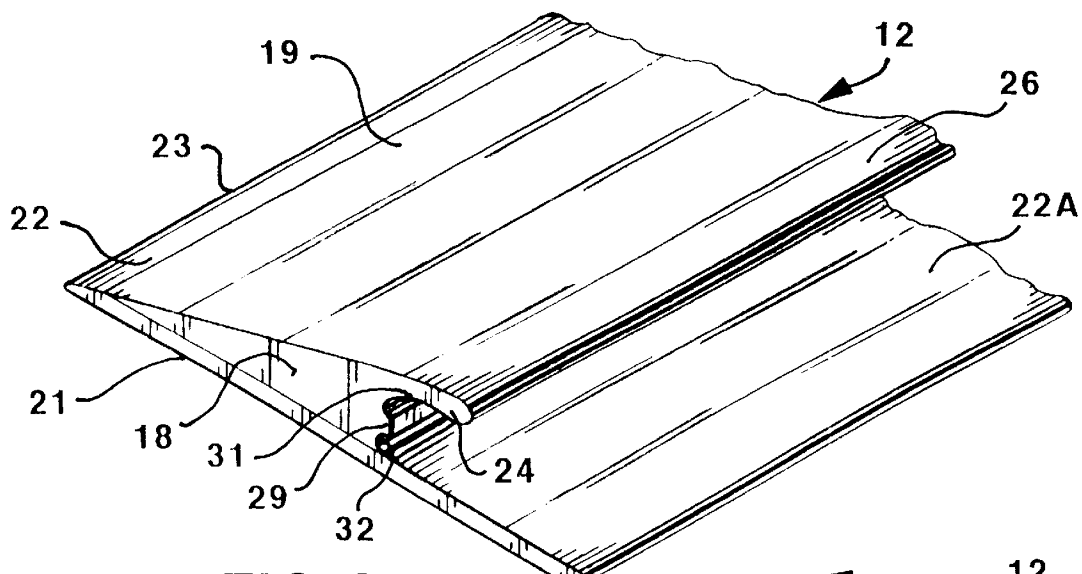
FIG. 4 is a perspective view of a section of the edge of the entrance mat of FIG. 1.
Figure 5:
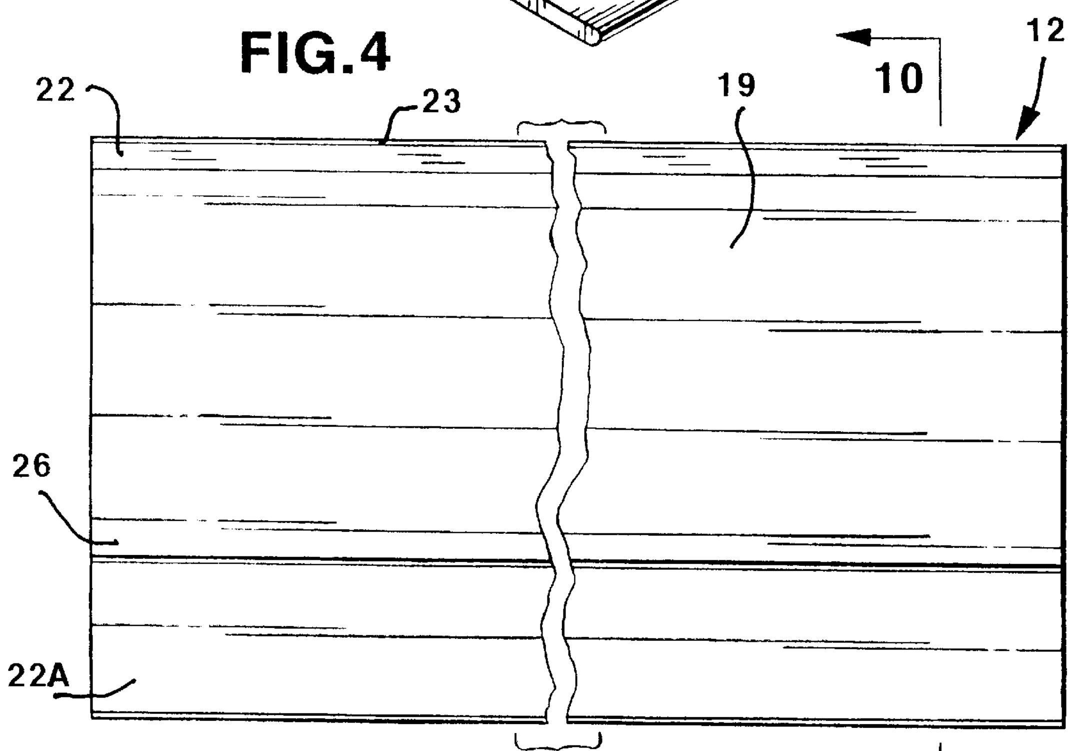
FIG. 5 is an enlarged and foreshortened top plan view of the edge of FIG. 4.
Figure 6:
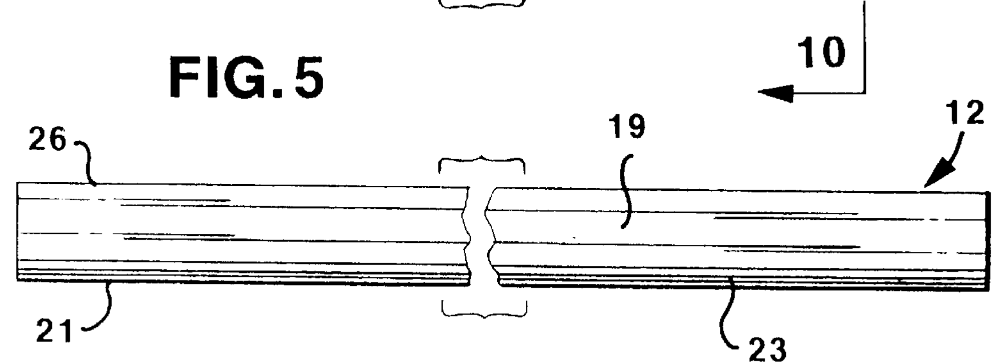
FIG. 6 is a foreshortened front elevational view of the edge of FIG. 5.
Figure 7:
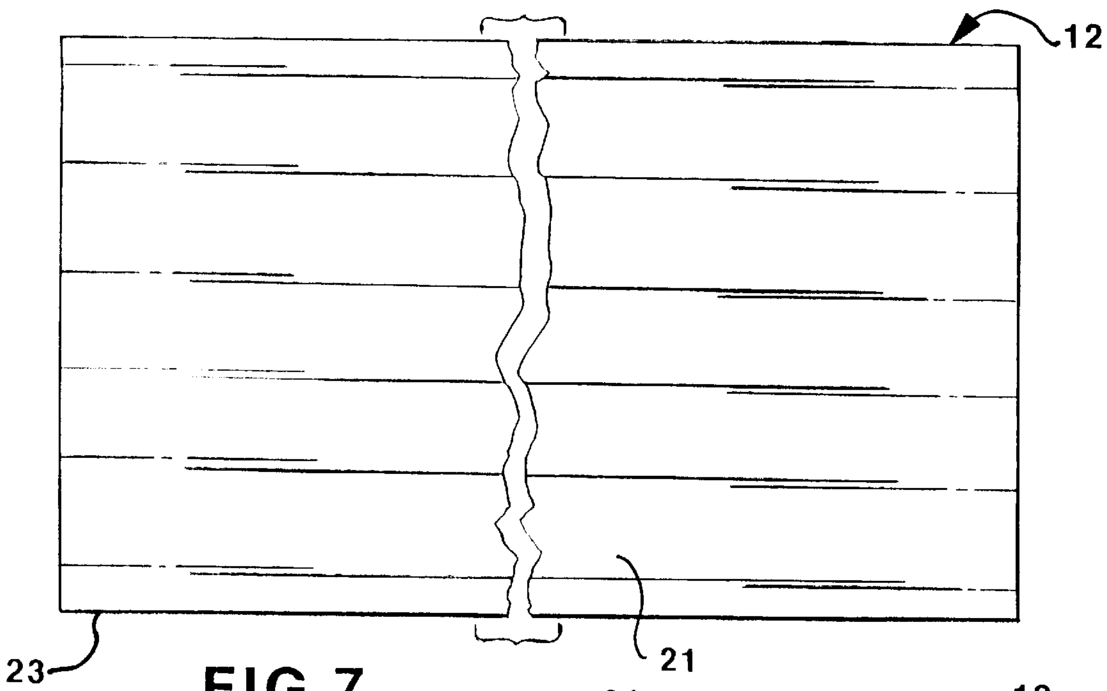
FIG. 7 is a foreshortened bottom plan view of the edge of FIG. 5.
Figure 8:
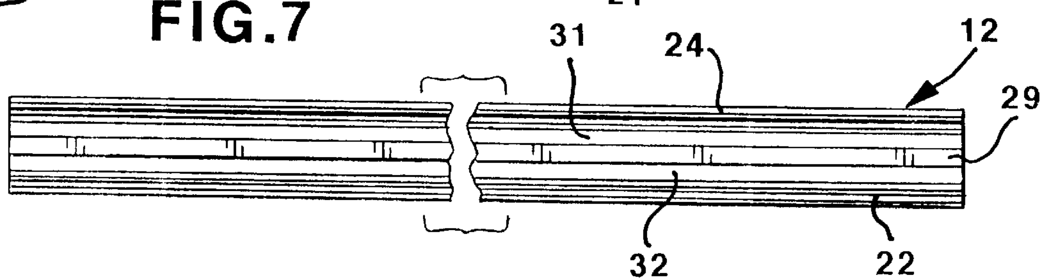
FIG. 8 is a foreshortened rear elevational view of the edge of FIG. 5.
Figure 9:
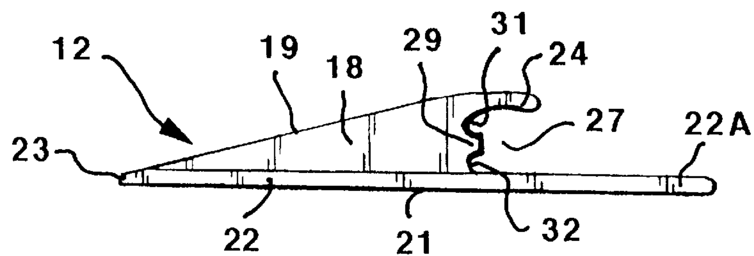
FIG. 9 is an end elevational view of the edge of FIG. 5.
Figure 10:
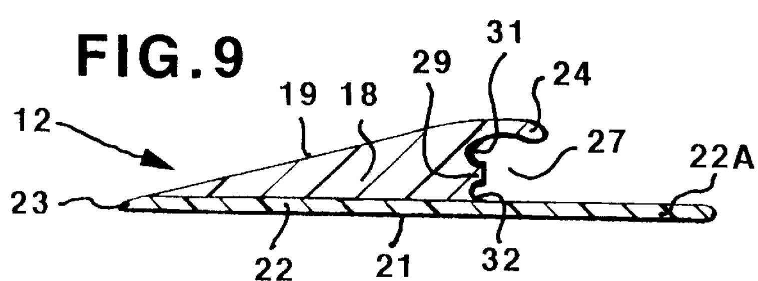
FIG. 10 is a sectional view taken along the line 10—10 of FIG. 5.
Figure 11:
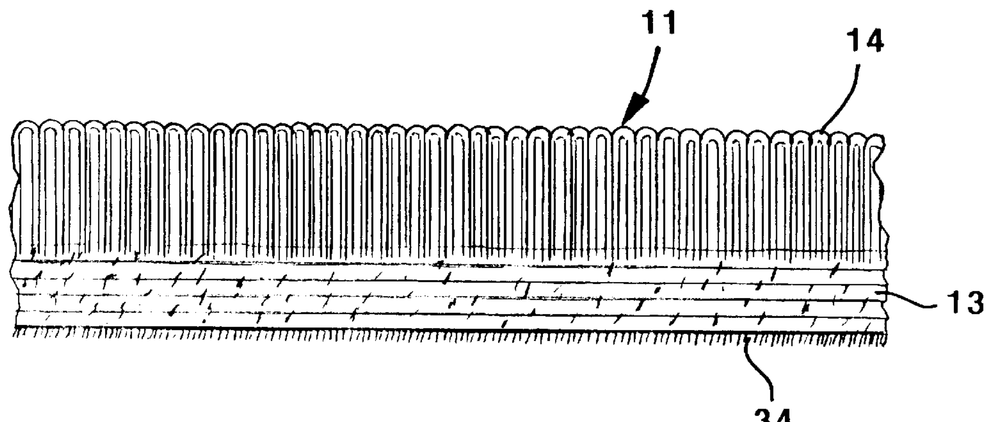
FIG. 11 is a sectional view of the greige for the mat.
Figure 12:
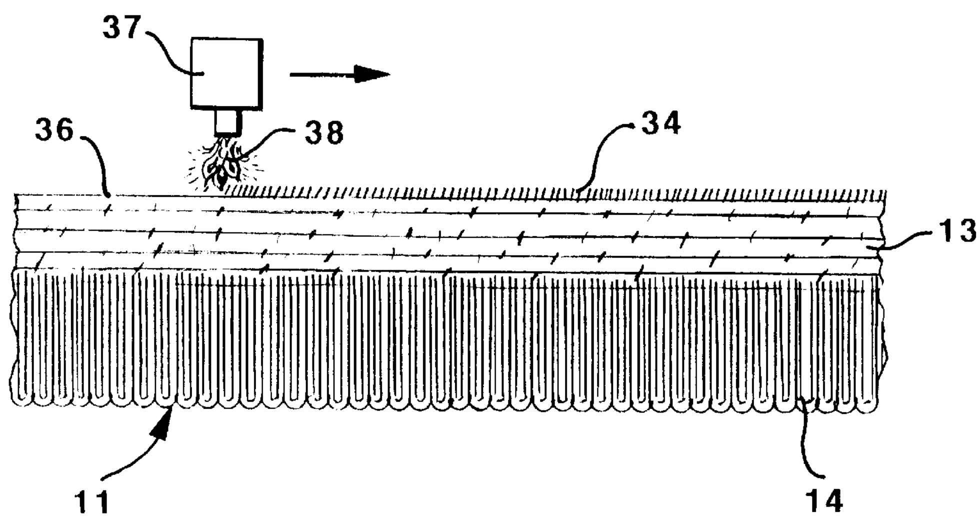
FIG. 12 is an inverted sectional view of the greige showing the flame removal of fibers from the bottom surface of the greige.

As shown in FIG. 3, pad 11 has a flat greige base 13 and upright loop plastic fibers 14. The base 13 and fibers 14 are greige with fibers mechanically interlocked by needle punching and heat bonding. Fibers 14 are wear resistant plastic stands, such as Nylon and polyprolene materials, which do not absorb water. For example, base 13 and fibers 14 are non-woven polyproplylene with an 18, 60, 100 denier blend and a fiber weight of 55 oz. per square yard. Other fibrous materials can be used to make pad 11.

A bottom layer or backing 15 bonded to the bottom surface of base 13 has a plurality of linear ribs 16 and linear grooves 17 open to the floor surface. Backing 15 is a high friction and tacky plastic that hugs the floor to minimize creep and folding of pad 11 and increase the cushion character of mat 10.

As shown in FIG. 3, edge 12 has a wedge shaped one piece body 18 with an upwardly and inwardly inclined top surface 19 and a flat bottom surface 21 and a web 22 joined to body 18. Surfaces 19 inclines upwardly at an angle of about 15 degrees from horizontal surface 21. Surfaces 19 and 21 converge to a linear outer edge or nose 23 at the forward end of web 22. The inner top section of body 18 is joined to an inwardly and downwardly curved lip 24. The top surface 26 of lip 24 has a convex curved inner section. The top surface 26 is below the horizontal top plane of the top of fibers 14 to enable wheeled carts and trucks to readily roll on and off of pad 11.

An example of edge 12 has the following configuration and dimensions. Body 18 is a solid plastic having a longitudinal length of 1½ inches with a flat top surface 19 inclined upwardly 15 degrees relative to the flat plane of the bottom surface 21 of web 22. Lip 24 has a length of ⅜ inch. Web 22 has a longitudinal length of 2¾ inches. The web extension 22A has a longitudinal length of 1⅜ inches. The length of web extension 22A is about equal to the length of the body 18. Web 22 has a uniform thickness of 1/16 inch. Web 22, lip 24, and body 18 are co-extruded into a one structure. Body 18 and lip 24 are polyvinyl chloride plastic having wear and cracking resistant and 80A hardness properties. Web 22 is a polyvinyl chloride plastic having non-skid and high friction properties. These different plastic materials are concurrently extruded as a one piece structure.

Body 18, lip 24, and web 22 form a clam shell pocket or groove 27 accommodating an outer edge 28 of greige base 13. Base 13 has been cut down or trimmed to fit into pocket 27. Body 18 has a rearwardly projected horizontal rib 29 that extends into pocket 27 and the outer edge of greige base 13. Linear recesses 31 and 32 are located above and below rib 29. A band or layer of bonding material or adhesive 33 secures body 18, lip 26 and rib 29 to the top, bottom and outer edge 28 of greige base 13 and the bottom of backing 15. Excess adhesive 22 flows into recesses 31 and 32 so that during the process of attaching edge 12 to greige base 13, the adhesive 33 does not flow past lip 24 into fibers 14. The entire inside surface of lip 24 is bonded with adhesive 33 to greige base 13 to prevent lip 24 from curling, cracking and turning up. Adhesive 22 is pocket 27 inhibits separation of pad 11 from edge 12 and prevents liquids, such as water, and dirt from accumulating under lip 24 and in pocket 27.

The process for making pad 11 is illustrated in FIGS. 11 to 16. The unbleached and undyed plastic fibrous material made with a needle punching and heat bonding process, know as greige and shown in FIG. 11, has a base 13 and side-by-side rows of looped fibers. The entire greige is polyproylene plastic fibers. The fibers of base 13 are packed down to form a dense mass of intertwined and tangled strands of plastic. The fibers 14 are flexible and project upwardly from base 13 to provide a flexible top cushion. The bottom of base 13 has short fibers 34 which are removed to provide a flat smooth bottom surface 36 on base 13. As shown in FIG. 23, a heating apparatus 37, such as a flame gun or torch, directs a flame or hot air 38 having sufficient temperature to remove fibers 34 and provide a substantially flat and smooth bottom surface 36.

Figure 13:
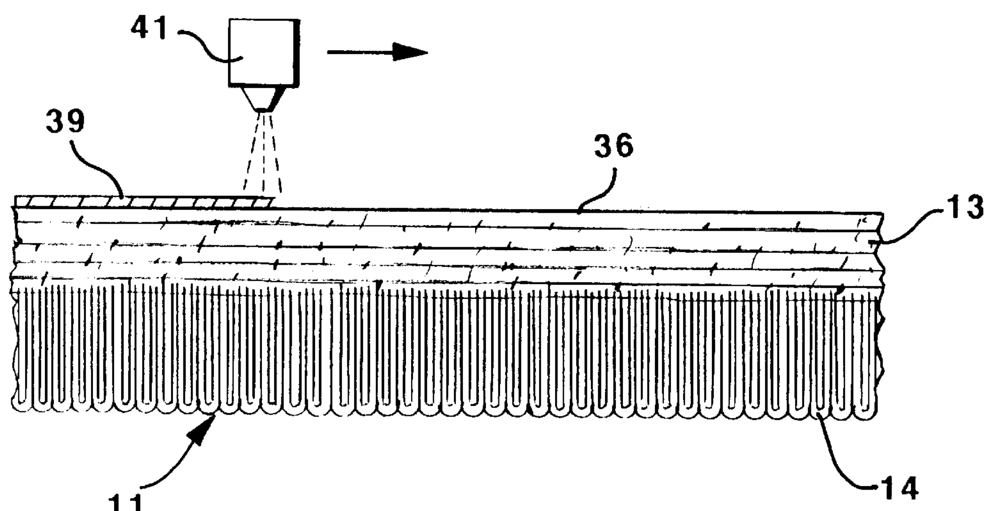
FIG. 13 is an inverted sectional view of the greige showing the application of liquid ethylene vinyl chloride to the bottom surface of the greige.

A layer of liquid 39 of a polypropylene compatible bonding enhancement liquid is sprayed on bottom surface 36. The liquid is an ethylene vinyl chloride or EVCL. The amount of liquid applied to surface 36 is, for example, 10 oz for each square yard of surface 36. A spraying apparatus 41, shown in FIG. 13, is moved over bottom surface 36 to deposit a substantially uniform layer of liquid 39 on the entire bottom surface 36 of base 13. Pad 11 can be moved relative to an apparatus for spraying liquid 39 on surface 36. The liquid 39 flows into the fibers of base 13 along bottom surface 36.

Figure 14:
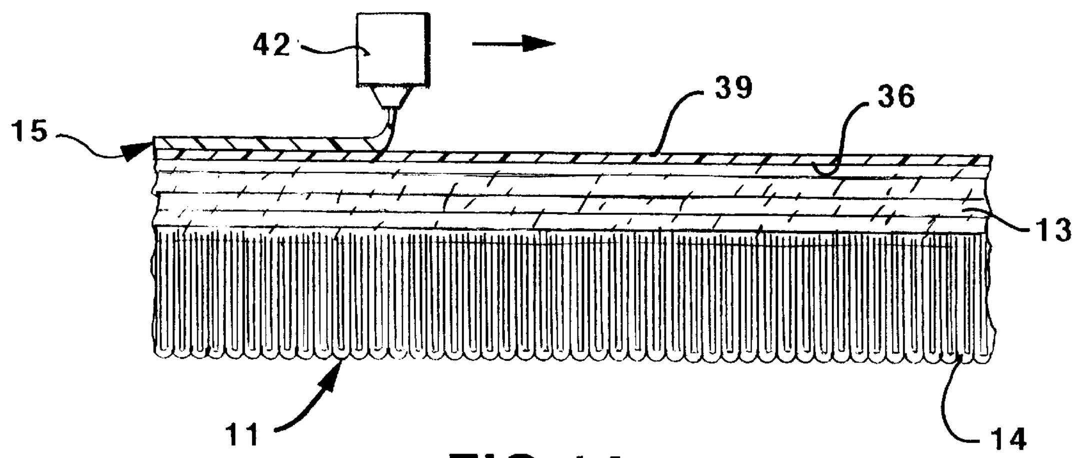
FIG. 14 is an inverted sectional view of the greige showing the application of plastic material to the bottom of the greige treated with the liquid shown in FIG. 13.

As shown in FIG. 14, backing 15 is deposited on liquid 39 and surface 36. A backing applicator 42 dispenses a substantially uniform layers of uncured semi solid plastic backing 15 on the entire surface of liquid 39 and bottom surface 36. Backing 15 is a thermoplastic vinyl resin having high friction and tacky properties. An example of the vinyl resin is polyvinyl chloride or PVC.

Figure 15:
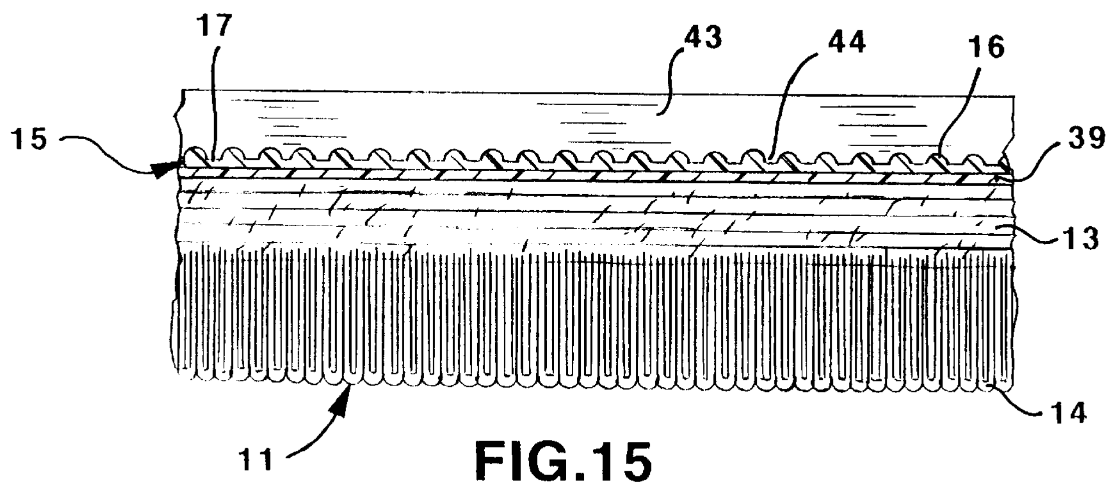
FIG. 15 is an inverted sectional view of the greige of FIG. 14 showing a rake making linear treads in the plastic material on the bottom of the greige.
Figure 16:
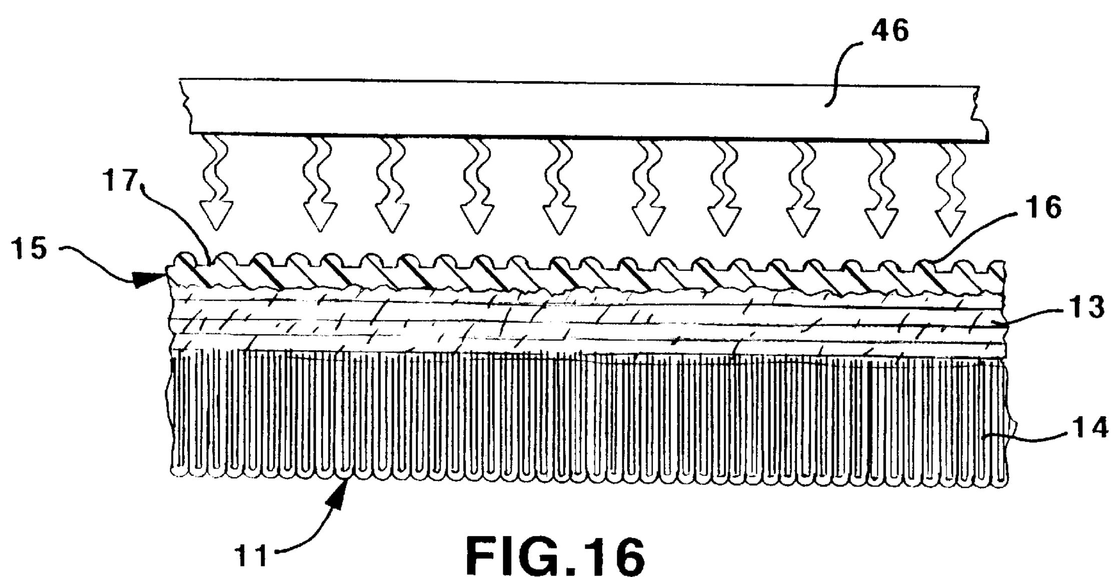
FIG. 16 is an inverted sectional view of the greige with treads in the plastic material on the bottom of the greige showing the heat curing of the plastic material.

A rake 43, shown in FIG. 15, having rows of teeth 44 is used to make linear treads 16 and grooves 17 in backing 15. Rake 43 is moved in a horizontal plane over backing 15 to spread the unset backing 15 and cover liquid 39. The backing 15 flows between teeth 44 to form the linear backing treads 16. Teeth 44 and the spaces between adjacent teeth 44 have generally semicircular profiles which provides backing ribs 16 with convex curved configurations.

After the backing treads 16 are formed in backing 15, pad 11 is moved through a heating apparatus 46, such as an oven, to heat cure the thermoplastic backing material. During the curing process te thermoplastic material is subjected to temperatures of 320 to 340 degrees Fahrenheit to cure the thermoplastic material and firmly bond backing 15 to greige base 13. The bond of backing 15 into the fibers of base 13 prevents peeling and cracking of the backing. The plastic curing temperature vary with the type of thermoplastic material used for backing 15.

As shown in FIGS. 17 and 18, outer peripheral edge 28 of pad 11 is cut-down or trimmed into greige base 13 providing the edge 28 of base 13 with a flat top surface 30. A shear or cutting device is used to trim edge 28. The width of edge 28 is about ⅜ to ½ inch and the thickness is also about ⅜ to 1½ inch to allow greige edge 28 to fit into pocket 27.

Adhesive 33 is spread on top of the extension 22A of web 22 back of body 18 and under lip 24. As seen in FIG. 19, adhesive is a uniform layer in pocket 27 and on extension 22A of web 22. The edge 12 is placed on greige by inserting the cut-down edge 28 into pocket 27 making sure that edge 28 completely fills pocket 27. The rib 29 is in firm contact with greige base 13. Adhesive 33 secures greige base 13 to lip 24, rib 29, body 18 and the extension 22A of web 22 to backing 15 and inhibits entrance of water, moisture, snow, ice, dirt and other foreign materials from collecting under lip 24 and in pocket 27.

Lip 24 is forced down into greige base 13 with external weight or pressure to assure maximum bond between edge 12 and greige base 13. As shown in FIG. 21, pressure, indicated by arrow 47, is applied to lip 24 to force lip 24 down and hold border 15 in firm engagement with the extension 22A of web 22. The adhesive 33 is forced into recesses 31 and 32 complete the bod with body 18 and rib 29. Excess adhesive 33 does not flow out of pocket 27 into fibers 14. The pressure on lip 24 is maintained during the drying of adhesive 33. Elongated clamps (not shown) having linear members in engagement with lips 24 around pad 11 can be used to apply pressure to lips 24. The adhesive is allowed to dry for a period of time, such as 8 hours before mat 10 is placed in service.

The adjacent metered corner surface 48 of edge 12, shown in FIGS. 1 and 2, are connected with an adhesive or glue. Water, moisture, and dirt does not collect adjacent surfaces 48 as they are tight in contact with each other and joined with adhesive. The ends of edge 12 do not peel away from pad 11 or backing 15 since they are joined together and secured with adhesive 33 to lip 24 and the extension 22A of web 22.

The loop fibers 14 can be coated with an EVCL liquid and an antimicrobial chemical that is added to the EVCL liquid. Polypropylene fiber is resistant to bacterial growth. Treatment of this fiber with an antimicrobial chemical precludes bacterial growth on pad 11. An example of an antimicrobial chemical is a chlorinated phenoxy compound made by Microban Products Company, 11515 Vanstory Drive No. 110, Huntersville, N.C. 28078.

The preferred embodiment of the mat and method of making the mat of the invention have been illustrated and described, it will be understood that changes in the materials, construction, and arrangement of structure maybe made without departing from the invention.

What is claimed is:

1. A mat comprising: a pad having a base and fibers projected upwardly from the base, said base having a peripheral edge portion with a top surface, a backing secured to the base, said backing having a peripheral edge portion, an edge having an upwardly inclined body, a lip joined to the body extended over the top surface of the peripheral edge portion of the base, and a web joined to the body having an extension located under the peripheral edge portion of the backing, said lip and extension providing a pocket accommodating the peripheral edge portion of the base and the peripheral edge portion of the backing, and adhesive means securing the edge portion of the base to the lip and body and the edge portion of the backing to the extension of the web.

2. The mat of claim 1 wherein: the pad is a polypropylene greige having a generally flat base and upright loop fibers joined to the base, said fibers being removed from the base to provide the peripheral edge portion of the base.

3. The mat of claim wherein: the backing is a plastic material having high friction properties bonded to the base.

4. The mat of claim 3 wherein: the backing has linear treads separated with linear grooves.

5. The mat of claim 3 wherein: the web is a high friction plastic material.

6. The mat of claim 1 wherein: the body includes at least one rib projected into the pocket and engageable with the base of the pad, said adhesive means bonding the rib to the base.

7. The mat of claim 6 wherein: said body has at least one recess adjacent the rib accommodating the adhesive means which bonds the rib and body to the base of the pad.

8. The mat of claim 1 wherein: the body is a tough and hard polyethylene chloride plastic, and the web is a soft and flexible polyethylene chloride plastic, said plastics being co-extruded with each other.

9. The mat of claim 1 wherein: the web has an upwardly and rearwardly inclined top surface co-extensive with the top surface of the body.

10. The mat of claim 1 wherein: the body and extension of the web have substantially the same longitudinal length.

11. The mat of claim 1 wherein: the backing is a high friction plastic material having linear treads separated with linear grooves, said web is a soft and flexible plastic material having a longitudinal length substantially the same as the longitudinal length of the body.

12. The mat of claim 11 wherein: the body includes a linear rib projected into the pocket and engageable with the base of the pad, said adhesive means bonding the rib to the base of the pad.

13. The mat of claim 12 wherein: the body has at least one linear recess adjacent the rib accommodating the adhesive means which bonds the rib and body to the base of the pad.

14. The mat of claim 1 wherein: the top surface of the peripheral edge portion of the base extends laterally away from the fibers projected upwardly from the base.

15. A mat comprising: a pad having a base and fibers projected upwardly from the base, said base having a peripheral edge portion with a top surface, a backing secured to the base, said backing having a peripheral edge portion, an edge having an upwardly inclined body, a lip joined to the body extended over the top surface of the peripheral edge portion of the base, and a web joined to the body having an extension located under the edge portion of the backing, said lip and extension providing a pocket accommodating the peripheral edge portion of the base and a portion of the backing, a rib joined to the body extended into the pocket and means securing the edge portion of the base to the lip, rib, body, and the edge portion of the backing to the extension of the web.

16. The mat of claim 15 wherein: the backing has linear treads separated with linear grooves.

17. The mat of claim 15 wherein: said body has at least one recess adjacent the rib accommodating the means which secures the rib and body to the base of the pad.

18. The mat of claim 15 wherein: the body is a tough and hard polyethylene chloride plastic, and the web is a soft and flexible polyethylene chloride plastic, said plastics being co-extruded with each other.

19. The mat of claim 15 wherein: the web has an upwardly and rearwardly inclined top surface co-extensive with the top surface of the body.

20. The mat of claim 15 wherein: the body and extension of the web have substantially the same longitudinal length.

21. The mat of claim 15 wherein: the backing is a high friction plastic material having linear treads separated with linear grooves, said web is a soft and flexible plastic material having a longitudinal length substantially the same as the longitudinal length of the body.

22. The mat of claim 15 wherein: the top surface of the peripheral edge portion of the base extends outwardly away from the fibers projected upwardly from the base.

* * * * *